Patented Nov. 19, 1929

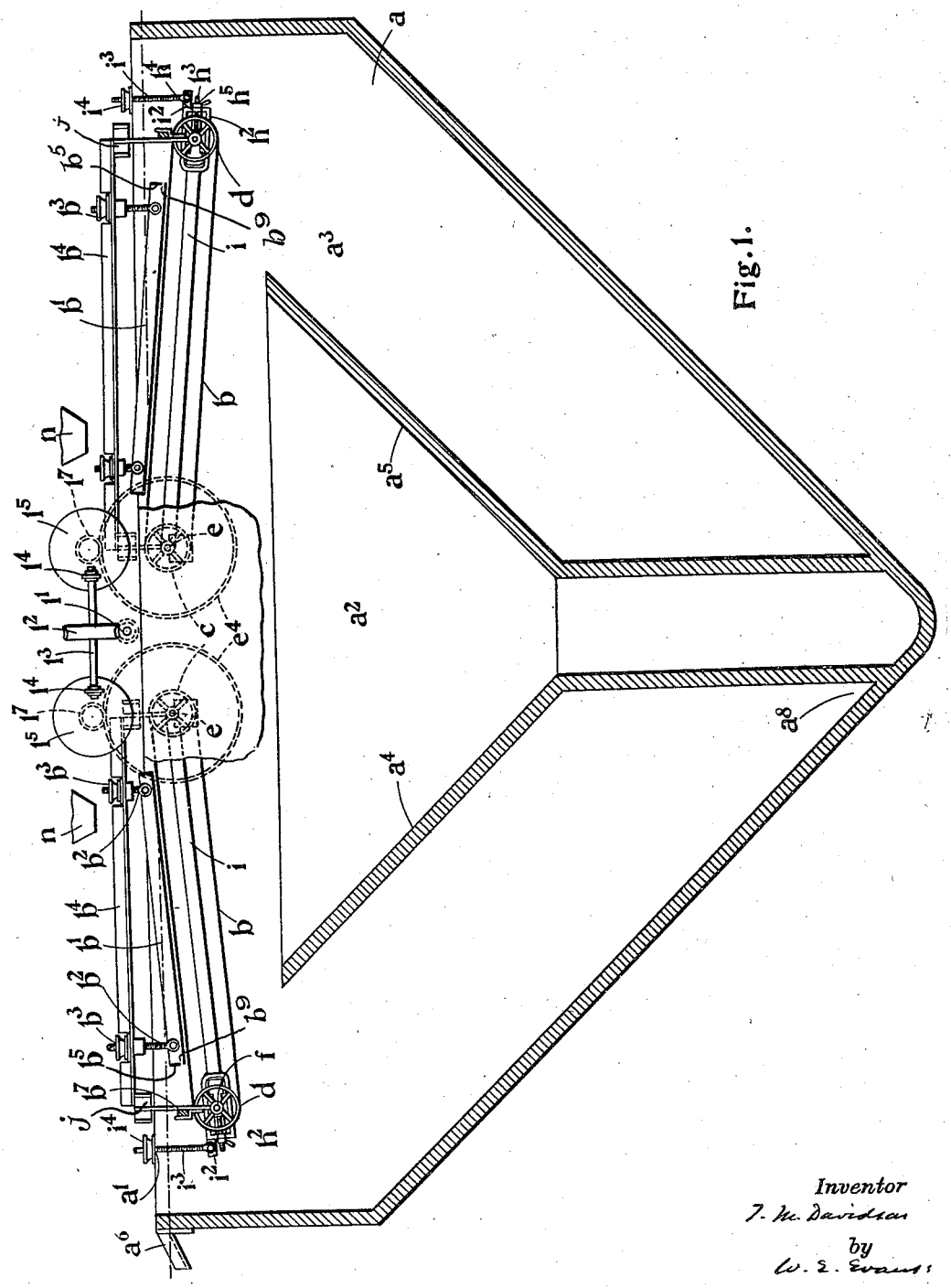

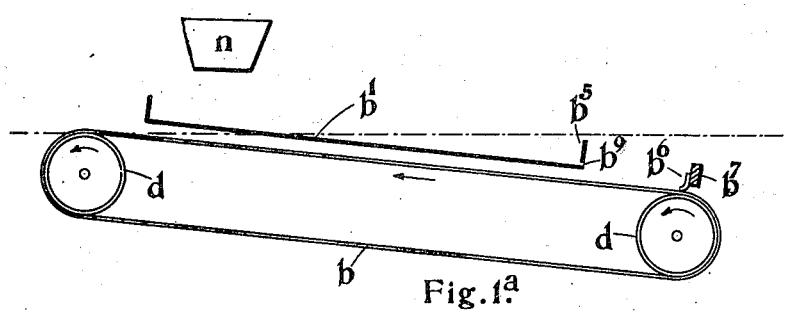
Fig.1.ª
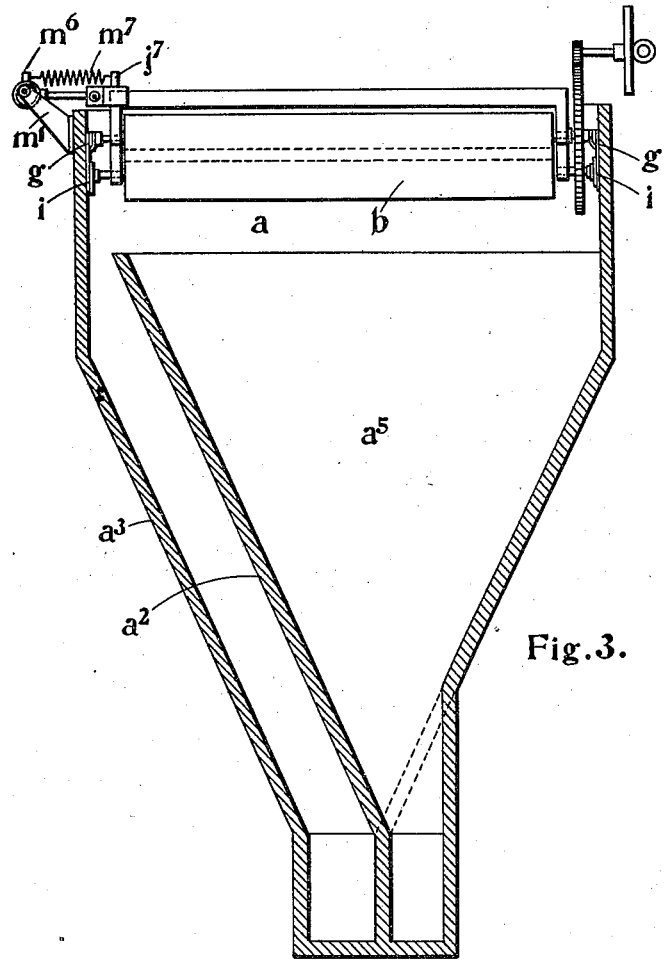
Fig.3.

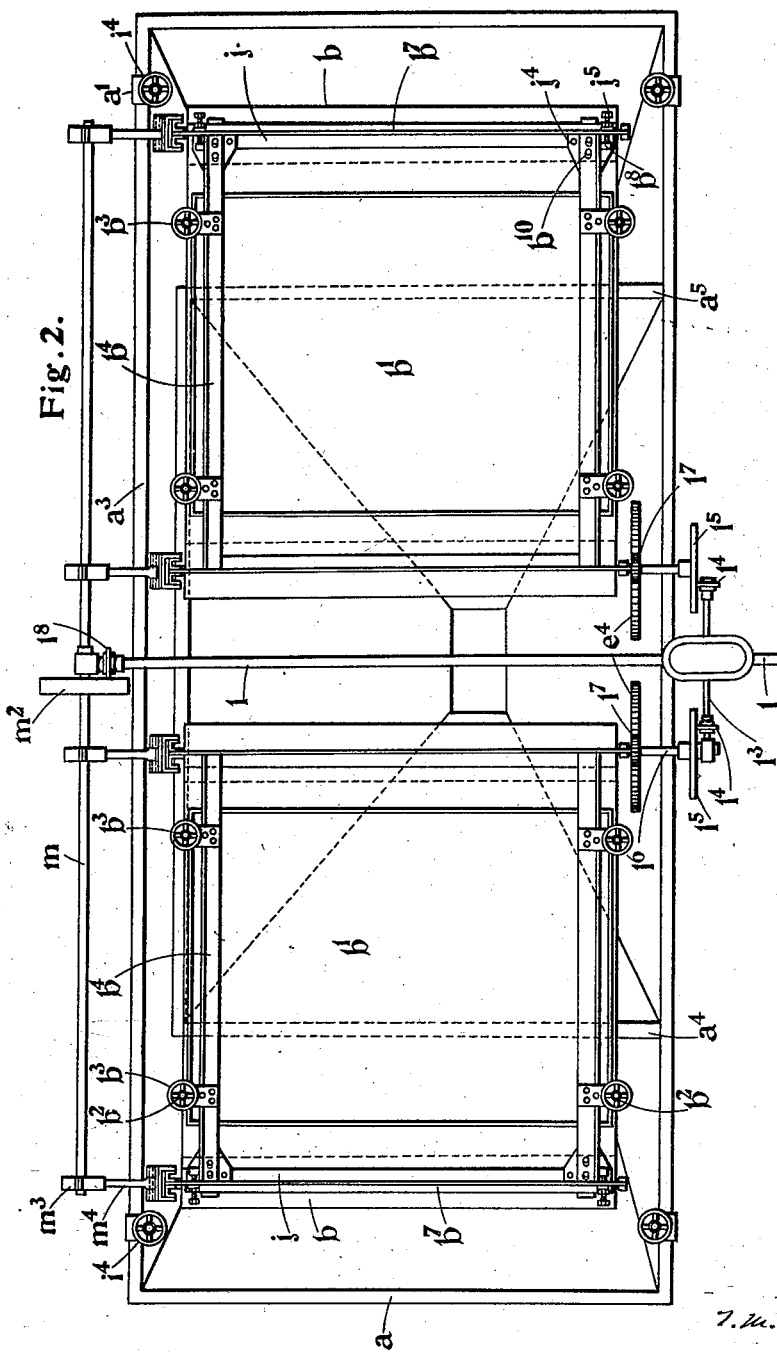

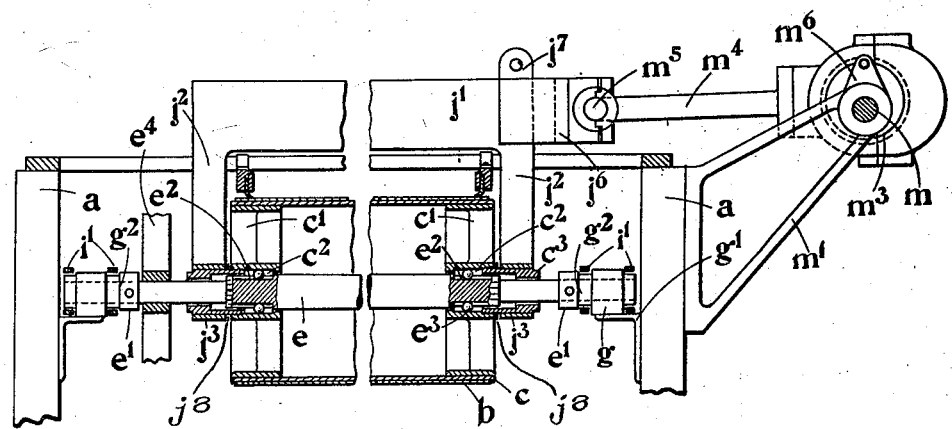
Fig.4.
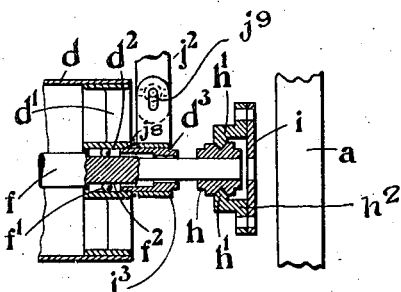
Fig.5.
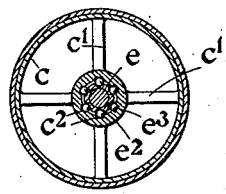
Fig.6.
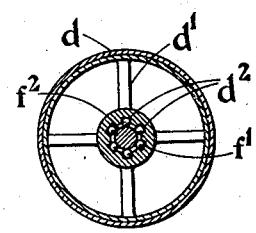
Fig.7.
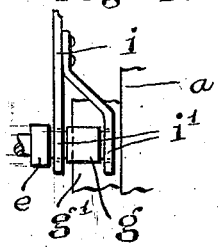
Fig. 4ª.

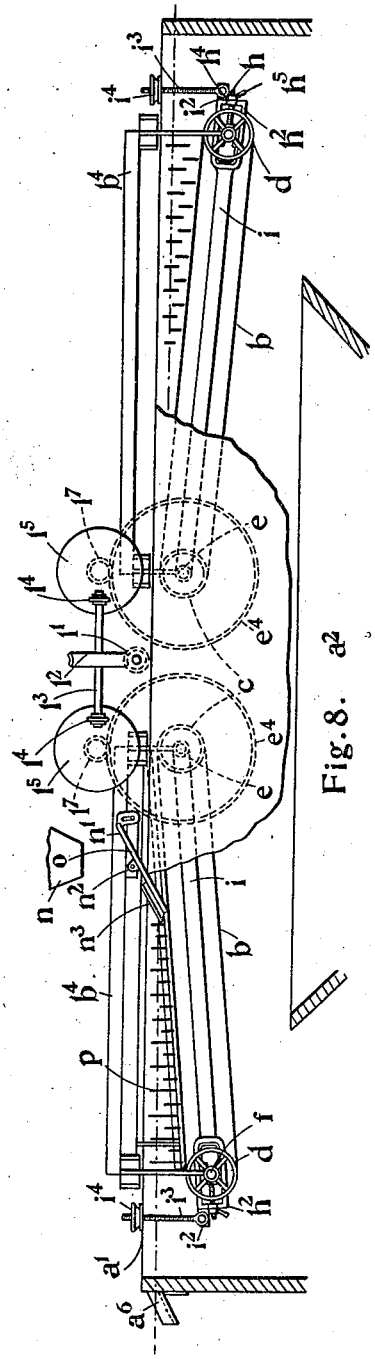

1,736,111

UNITED STATES PATENT OFFICE

THOMAS MALCOLM DAVIDSON, OF HATCH END, MIDDLESEX, ENGLAND

SEPARATION OF MINERALS AND OTHER SUBSTANCES

Application filed September 14, 1926, Serial No. 135,454, and in Great Britain September 21, 1925.

This invention relates to the washing and separation of minerals and other substances, whereby separation is effected according to the relative specific gravities of the mineral and the gangue, dirt or foreign matter associated with it.

The invention has special utility in the washing and separation of coal for the reduction of its content of ash by washing, and for the separation of the heavier foreign bodies commonly associated with it, such as pyrites, shale, sand and stone, and the invention has among its objects to effect a substantially complete separation of the mineral in a simple operation that does not involve the use of an extensive or expensive apparatus.

The invention relates to that type of method or apparatus for the separation or washing of minerals and other substances, in which the reduced or finely divided substance under treatment is fed to an endless conveyor whose upper surface is inclined, and has imparted to it a forward and upward movement in the direction of its inclination, as well as a transverse reciprocation, whereby the lighter particles are discharged at the lower end of the inclined endless conveyor, while the heavier particles are discharged at the upper end thereof.

According to the invention, the finely divided material to be separated is first fed to an inclined surface or tray which is also subject to vibration or transverse reciprocation, whereby the finely divided material, in its downward course along the inclined surface or tray, is more or less separated before deposit upon the separating conveyor, and the heavier particles are discharged from the inclined surface or tray onto the conveyor at a position immediately beneath the lower end or other position of discharge, while the lighter particles are deposited upon the separating conveyor in positions beyond.

A small spray of water or the like may be applied at the top of the upper end of the inclined endless conveyor to further aid in complete separation of any light particles from the heavier particles that pass upwardly on the conveyor, and the main part of the inclined surface or tray, as well as the separating conveyor beneath it, are submerged in water.

The inclined surface or tray is advantageously provided at its lower end with a transverse wall in the lower part of which a slot or the like is provided as an outlet for the heavier particles that, in their downward course under the vibration or reciprocation imparted to the inclined surface or tray, accumulate more or less at the bottom of the surface or tray, the transverse wall thus serving as a baffle by which the finely divided particles accumulate at the lower part of the surface or tray, and thus the lighter particles pass off the inclined surface or tray over the upper edge of the transverse wall and are deposited on the conveyor in position immediately beyond, while the heavier particles pass through the slot or the like at the lower part of the end wall, and thus are deposited in position on the conveyor immediately beneath the lower end of the inclined surface or tray.

The invention comprises the features of method and apparatus hereinafter described.

The invention is hereinafter described with reference to the accompanying diagrammatic drawings, in which:

Figure 1 is a sectional elevation of a separating apparatus according to the invention.

Figure 1ª is a diagram illustrating the arrangement of the separating elements shown in Figure 1.

Figure 2 is a plan view corresponding to Figure 1.

Figure 3 is a cross sectional view corresponding to Figure 1.

Figure 4 is a longitudinal sectional view on an enlarged scale of the upper roller of one of the endless belt conveyors and shows also the frame effecting the reciprocation of the rollers and the eccentric therefor.

Figure 4ª is a detail plan view of the sleeve provided at one extremity of the tie-bar.

Figure 5 is a detail sectional view on the same scale as Figure 4 of the mounting for the lower roller.

Figure 6 is a sectional view on an enlarged scale of the upper roller taken through a bearing thereof.

Figure 7 is a similar view of the lower roller, and

Figure 8 is a view in sectional elevation of a modification.

In carrying the invention into effect according to one construction and with reference to Figures 1 to 7 of the accompanying diagrammatic drawings, a tank $a$ is provided which conveniently approximates in form to an inverted pyramid, but has the upper side walls disposed vertically to adapt them to receive the bearings or supports for the endless conveyors, of which two are provided.

Each conveyor comprises an endless belt $b$ passing around upper and lower rollers $c$, $d$, the upper rollers of the two conveyors being mounted in juxtaposed positions. In each case the shaft $e$ of the upper roller is rotatably supported at each end in a bearing $g$ carried by an angle bracket $g^1$ mounted on the vertical upper side wall of the tank. Longitudinal movement of the shaft is prevented by means of collars $e^1$.

The shaft $f$ of the lower roller $d$ is supported and advantageously fixed at each end in a bearing block $h$ having a groove formed in each of the upper and lower surfaces, transversely to the axis, for engagement with correspondingly formed slide bars $h^1$ provided upon an open frame or fitting $h^2$ secured to one end of a tie bar $i$, the other end of which is pivotally fitted upon the bearing $g$. For this purpose the end of the tie bar $i$ is formed into an eye or sleeve $i^1$ and a second eye or sleeve $i^1$ is formed in a short cranked bar-fitting riveted or bolted to the tie bar. The eyes or sleeves $i^1$ embrace corresponding bosses $g^2$ upon the bearing.

For variation of the tension of the belt $b$, the bearing blocks $h$ are adjusted along the slide bars $h^1$ by means of screwed spindles $h^3$ carried by them and passing through lugs $h^4$ formed upon the frames or fittings $h^2$ for engagement with adjusting nuts $h^5$. For adjustment of the inclination of the belt, the tie bars $i$ are provided at the free ends with lugs $i^2$ to which are pivoted screwed spindles $i^3$ adapted to slide through supporting brackets $a^1$ mounted upon the walls of the tank and to be engaged by adjusting nuts $i^4$. By such means the inclination of the belt may be varied as desired, for instance, over a range of say 10°.

The rollers $c$, $d$ are adapted to have axial movement upon their respective shafts to a limited degree, and for this purpose the upper roller $c$ is provided with spiders $c^1$, the bore of each of which is somewhat larger in diameter than the shaft and formed with a number of longitudinal recesses $c^2$ which may be of rectangular cross-section, extending from the outer end partly through the bore. The shaft is formed with corresponding recesses $e^2$, and balls $e^3$ are seated partly within the recesses $c^2$ of the spiders and partly in the recesses $e^2$ of the shaft, thus serving to support the roller upon the shaft, in such manner that, while the roller is free to move axially to the extent permitted by the length of the recesses, the rotation of the shaft is communicated to the roller. The outer end of the bore of the spider $c^1$ is closed by an annular cap $c^3$ screwing into a screw-threaded part of the bore, so that the cap, when in position, serves to confine the balls $e^3$ within the recesses $c^2$, $e^2$.

The lower roller $d$ is similarly provided with spiders $d^1$ each having a bore which is somewhat larger in diameter than the shaft $f$ and formed with longitudinal recesses $d^2$ for the reception of the balls $f^1$. The shaft $f$ is not recessed to receive the balls, but is formed with a portion $f^2$ of reduced diameter upon which they may bear, so that the spider is rotatably carried upon the shaft, and may also move axially. As in the case of the upper roller, caps $d^3$ are provided for closing the recesses $d^2$ and for retaining the balls $f^1$ therein.

The belt, which may be of rubber or any other suitable material, is made endless and passes direct from one roller to the other.

For the transverse reciprocation of the endless belt there is provided, for each conveyor, a frame comprising two transverse members $j$ disposed above and parallel with the axes of the respective upper and lower rollers $c$, $d$, and two longitudinal members $d^4$ connecting the transverse members. The transverse and longitudinal members $j$, $b^4$ may be of angle, channel or other section metal or of wood. The transverse members have secured to them plate members $j^1$, provided at each end with a downwardly extending arm $j^2$ having at its lower end a sleeve $j^3$ which is adapted to embrace the cylindrical exterior surface of the corresponding cap $c^3$ or $d^3$ of the roller; and thus, to support the frame thereon. Cushioning springs $j^8$ are advantageously interposed between the sleeves $j^3$ and the spiders $c^1$, $d^1$. The arms $j^2$ of the plate member disposed above the lower roller $d$ are provided in two parts which may be adjusted relatively one to the other to follow the adjustments made in respect of the shaft bearings for variation of the inclination of the belt. The two parts of the respective arms may be secured together in any suitable manner, as by means of slots and bolts $j^9$.

In position immediately above the submerged conveyor $b$, an inclined surface or tray $b^1$ is provided, which inclined surface or tray may be disposed substantially parallel with the upper part of the conveyor $b$. The inclined surface or tray $b^1$ may be provided to have imparted to it a transverse reciprocation. Means may be provided by which the inclination of the inclined surface or tray $b^1$ may be varied independently of the inclination of the conveyor $b$. Such means may comprise screw-threaded rods $b^2$ to the lower end of which the tray $b^1$ is pivoted, and which pass through fittings extending laterally from the longitudinal members $b^4$, adjusting nuts $b^3$ being provided to engage with the rods $b^2$ for their adjustment. The inclined surface or tray $b^1$ may be provided of a width co-extensive with that of the conveyor $b$ and advantageously of a length less than that of the upper part of the conveyor, the inclined surface or trap $b^1$ being advantageously disposed so that at its upper end it rises above the level of the liquid, as may also the upper end of the upper part of the conveyor $b$. At the lower end of the inclined surface or tray $b^1$ a transverse wall $b^5$ is provided which may be normally disposed to the inclined surface or tray $b^1$, in the lower part of which wall $b^5$ a slot $b^9$ is formed, extending the width of the tray, the slot $b^9$ being so disposed that the material lying at the bottom of the lower end of the tray $b^1$ readily falls through the slot $b^9$ and downwards onto the conveyor $b$ beneath. The lower end of the conveyor $b$ extends beyond the lower end of the inclined surface or tray $b^1$, and a transverse apron $b^6$ of rubber or other suitable material is provided, the transverse apron $b^6$ being advantageously carried by a transverse bar $b^7$ secured to the frame or otherwise.

In order that the frame may be adjusted to compensate for variation in the length of the belt, the transverse member $j$ above the roller $d$ is connected to the longitudinal members $b^4$ by means of web plates $j^4$ carrying bolts which pass through longitudinally disposed slots $b^{10}$ in the longitudinal member $b^4$. The relative position is determined by means of abutments or lugs $b^8$ on the longitudinal members $b^4$ and adjusting screws $j^5$ passing through screwed blocks secured to the plate member $j^1$.

The forward movement and the transverse reciprocation of the belts are effected from a main driving shaft $l$ which is disposed above and transversely to the tank $a$ midway between the two conveyors.

For the forward movement of the belts, there is provided on the main driving shaft $l$ a worm $l^1$ which engages a worm wheel $l^2$ fixedly mounted upon a longitudinal shaft $l^3$ upon which are slidably mounted friction wheels $l^4$ adapted respectively to drive friction discs $l^5$. The latter are respectively mounted upon counter-shafts $l^6$ which carry pinions $l^7$ adapted to engage spur wheels $e^4$ mounted fixedly upon the shafts $e$ of the upper roller $c$.

The speed of the forward movement of each belt may be readily varied and regulated by adjustment of the corresponding friction wheel $l^4$ along the transverse shaft $l^3$ so that the speed of rotation of the counter-shaft $l^6$ is increased or decreased.

For the transverse reciprocation of the belts, a shaft $m$ is carried in brackets $m^1$ secured to one of the side walls of the tank at the upper edge on the outer side, and so that the shaft is disposed on the level of the plate member $j^1$. The shaft $m$ is rotated from the main driving shaft $l$ by a friction wheel $l^8$ slidably mounted upon the main driving shaft $l$ and engaging a friction disc $m^2$ secured to the shaft $m$ to be rotated so that the speed of rotation of the latter may be readily varied. Opposite each of the plate members $j^1$ the shaft $m$ is fitted with an eccentric $m^3$, the rod $m^4$ of which is pivotally connected to the adjacent end of the oppositely disposed plate member. The connection is conveniently made by means of a transverse axis or pivot pin $m^5$ upon the rond $m^4$ engaging a bearing bracket $j^6$ secured to the plate member $j^1$ so that the pin $m^5$ is in the same horizontal plane as the shaft $m$. The bearing bracket $j^6$ is conveniently formed with a channel-shaped base or body portion, which embraces and is secured to two short lengths of channel-section metal vertically disposed one on each side of the plate member $j^1$ and secured thereto. In order to avoid uneven movements and shock and to take up wear, a lug $j^7$ on plate member $j^1$ is connected by a spring $m^7$ with a lug $m^6$ on the adjacent bearing bracket $m^1$.

For the collection of the separated material, the tank is provided with an inner chamber formed by a partition $a^2$ which extends parallel to one of the side walls $a^3$ of the tank and by end walls $a^4$, $a^5$, the upper portions of which are disposed at an inclination corresponding in angle with that of the adjacent end walls of the tank, while the lower portions of the said walls are disposed vertically. Thus, the lower portion of the chamber is substantially triangular in the transverse section and rectangular in the longitudinal section. The upper open end of the chamber extends in each direction from the middle of the tank sufficiently to ensure that the upper rollers $c$ of the two endless conveyors may deliver the heavier material thereto and thus, the heavier material passes downwardly through the chamber $a^2$. The lighter material, which is delivered over the lower rollers $d$, passes down along the inclined end walls of the tank, into the position $a^8$, whence it may be removed by any suitable means. An adjustable weir member $a^6$ may be provided by which the level of water or other liquid within the tank may be determined.

The coal or other material in a finely divided condition is fed from a hopper $n$ to the upper part of the inclined surface or tray $b^1$ above the level of the liquid and, on the vibration or transverse reciprocation of the inclined surface or tray $b^1$ and of the conveyor $b$ the finely divided material gradually passes downwardly and in doing so gradually separates, to a greater or less extent, the heavier from the lighter particles, so that the heavier particles pass through the slot $b^9$ in the transverse wall $b^5$ of the baffle onto the conveyor $b$ in position immediately beneath, while the finer particles accumulate at the bottom of the tray $b^1$ and are fed over the upper edge of the end wall or the baffle $b^5$ to accumulate upon the conveyor $b$ at a position between the lower end of the inclined surface or tray $b^1$ and the jointing apron $b^6$ referred to. In this way, the particles are deposited on the conveyor $b$ more or less separated according to their specific gravities, the coarser particles being deposited on the conveyor in position above the finer particles. Thus, in the upward movement of the upper part of the conveyor $b$, the respective particles are further separated and the finer particles accumulate in a position between the lower end of the inclined surface or tray $b^1$ and the jointing apron $b^6$ and pass over the upper edge of the apron $b^6$ or its support $b^7$, into the liquid in a position where it is separately collected, while the heavier particles pass upwardly on the conveyor $b$ and are discharged over the upper end thereof into the liquid and are there collected.

It will be understood that the inclined surface or tray $b^1$ is advantageously provided to be transversely reciprocated with the conveyor $b$ in the manner hereinbefore described.

According to a modification, as illustrated in Figure 8, the coal or other material in a finely divided condition may be fed from a supply hopper $n$ or feed box to an inclined shoot $o$, the lower end of which is immersed in the water or other liquid and reaches the proximity of the supporting or upper surface of the belt at a position which is sufficiently below the surface level of the water or other liquid, that the material is delivered to the belt at a point where the water or other liquid is undisturbed. The shoot, which is conveniently of a width somewhat less than that of the belt, may, as shown in the drawing, be carried by the roller frame so that it partakes of the transverse reciprocation to which the frame and the rollers are subjected. For this purpose it may be supported upon the longitudinal members $b^4$ by such means as brackets $n^1$ to which it is secured or upon which it is supported by bolts or pins $n^2$ in such manner that the inclination may be varied as desired.

The material delivered to the endless belt from the shoot is separated as the result of the forward movement and transverse reciprocation of the belt. Thus, in the case of coal the heavy impurities are deposited upon the belt surface and remain thereon, being carried upwardly and discharged over the upper roller, while the coal as the result of the lateral reciprocation of the belt, is maintained in movement and passes downwardly for delivery over the lower roller.

It is advantageous to provide transverse aprons or strips of rubber to bear upon the belt immediately over the lower rollers $d$ and thus, to ensure that the lighter substances accumulate against the apron and finally discharge over the upper edge of the apron. The aprons may conveniently be carried by supporting bars secured to the arms $j^2$ of the roller frame or to the plate members $j^1$. Similarly, it is advantageous to provide lateral aprons of rubber to bear upon the edges of the supporting or upper surface of the belt. Such aprons may be carried by longitudinally disposed bars or supports mounted on or supported from the side walls of the tank.

When the material to be separated is of a light character, such as zinc slime, there is a tendency for particles to float upon the surface of the water or other liquid. It is desirable, therefore, that baffle plates $p$ should be disposed transversely in the tank across the portion of the tank above the lower end of the supporting or upper surface of the belt. Certain of the baffles may be submerged in the water or other liquid with their lower edges disposed at a distance of, for example, one quarter of an inch from the supporting or upper surface of the belt, while the intermediate baffles may project above the level of the water or other liquid, and have their lower edges disposed so that they are lower than the upper edges of the submerged baffles. The floating particles connect against such baffle plates and in time sink onto the belt. It is further desirable, with certain light materials, to provide the shoot of closed form, or to fit over the lower end, which is immersed in the water or other liquid, a shield or cover such as $n^3$.

In the case of materials such as zinc slimes, it is desirable to permit the separated constituents, more particularly the lighter constituent, to accumulate in the bottom of the tank and to pass away merely by overflowing under the assistance of a screw or paddle elevator or agitator. It is further desirable to provide a draw-off opening or outlet for the separated constituents at the lower end of the casing. This is specially desirable in the treatment of minerals giving heavy concentrates. The tailings may be pumped out by means of a centrifugal pump.

It will furthermore be understood that in addition to the inclined surface or tray a series of baffles $p$ such as hereinbefore described may be employed.

I claim:

1. Apparatus for the treatment of minerals and other substances for washing and separation comprising an endless stratifying conveyor whose upper surface is inclined, a tank within which the said conveyor is disposed, the said tank being adapted to be filled with liquid to a level such that at least part of the said conveyor is immersed, means for reciprocating the said conveyor in a direction transverse to its upper surface, means for moving the upper surface of the said conveyor in an upward direction, means for feeding to the said conveyor the finely divided and coarser particles of the substance to be treated at a position where it is adapted to be immersed in the liquid contained in the tank and where the liquid is in a substantially undisturbed condition, comprising an inclined separating shoot having its lower part immersed in the liquid contained in the tank, the lower part having a transversely disposed end wall at the end of the said inclined separating shoot adapted to serve as a weir and adapted for the discharge over it of a proportion of the finely divided particles, and an outlet near the front end of the said shoot adjacent the upper surface of the said shoot and adapted for the discharge of a substantial proportion of the coarser particles, and means for subjecting the said shoot to the same transverse reciprocation as the said conveyor, substantially as described.

2. Apparatus for the treatment of minerals and other substances for washing and separation comprising an endless stratifying conveyor whose upper surface is inclined, a tank within which the said conveyor is disposed, the said tank being adapted to be filled with liquid to a level such that at least part of the said conveyor is immersed, means for reciprocating the said conveyor in a direction transverse to its upper surface, means for moving the upper surface of the said conveyor in an upward direction, means for feeding to the said conveyor the finely divided and coarser particles of the substance to be treated at a position where it is adapted to be immersed in the liquid contained in the tank and where the liquid is in a substantially undisturbed condition, comprising an inclined separating shoot having its lower part immersed in the liquid contained in the tank, the lower part having a transversely disposed end wall at the end of the said inclined separating shoot adapted to serve as a weir and adapted for the discharge over it of a proportion of the finely divided particles, an outlet near the front end of the said shoot adjacent the upper surface of the said shoot and adapted for the discharge of a substantial proportion of the coarser particles, means for subjecting the said shoot to the same transverse reciprocation as the said conveyor, and means for varying the inclination of the said inclined separating shoot, substantially as described.

3. Apparatus for the treatment of minerals and other substances for washing and separation comprising an endless stratifying conveyor whose upper surface is inclined, a tank within which the said conveyor is disposed, the said tank being adapted to be filled with liquid to a level such that at least part of the said conveyor is immersed, means for reciprocating the said conveyor in a direction transverse to its upper surface, means for moving the upper surface of the said conveyor in an upward direction, means for feeding to the said conveyor the finely divided and coarser particles of the substance to be treated at a position where it is adapted to be immersed in the liquid contained in the tank and where the liquid is in a substantially undisturbed condition, comprising an inclined separating shoot having its lower part immersed in the liquid contained in the tank, the lower part having a transversely disposed end wall at the end of the said inclined separating shoot, adapted to serve as a weir and adapted for the discharge over it of a proportion of the finely divided particles, and an outlet near the front end of the said shoot adjacent the upper surface of the said shoot and adapted for the discharge of a substantial proportion of the coarser particles, means for subjecting the said shoot to the same transverse reciprocation as the said coveyor, the said inclined separating shoot being adapted to be disposed substantially parallel with the upper surface of the said conveyor, substantially as described.

THOMAS MALCOLM DAVIDSON.